US012719289B2

(12) United States Patent
Chai

(10) Patent No.: US 12,719,289 B2
(45) Date of Patent: Aug. 25, 2026

(54) REACTIVE CURRENT INJECTION FOR ACTIVE AEROSPACE RECTIFICATION

(71) Applicant: Hamilton Sundstrand Corporation, Charlotte, NC (US)

(72) Inventor: Huazhen H. Chai, Discovery Bay, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 241 days.

(21) Appl. No.: 18/326,372

(22) Filed: May 31, 2023

(65) Prior Publication Data

US 2024/0405572 A1 Dec. 5, 2024

(51) Int. Cl.
*H02J 4/00* (2026.01)
*B64D 27/35* (2024.01)
*H02P 27/04* (2016.01)

(52) U.S. Cl.
CPC ................ *H02J 4/00* (2013.01); *B64D 27/35* (2024.01); *H02P 27/04* (2013.01); *B64D 2221/00* (2013.01)

(58) Field of Classification Search
CPC . H02J 4/00; H02J 2310/44; H02J 3/18; B64D 27/35; B64D 2221/00; H02P 27/04
See application file for complete search history.

(56) References Cited

U.S. PATENT DOCUMENTS

| | | | |
|---|---|---|---|
| 4,935,860 A | 6/1990 | Kirchberg et al. | |
| 7,148,661 B2 | 12/2006 | Trainer et al. | |
| 7,808,219 B2 | 10/2010 | Ye et al. | |
| 10,128,768 B2 | 11/2018 | Recio et al. | |
| 10,848,075 B2 | 11/2020 | Mohamed Sayed Ahmed et al. | |
| 11,418,034 B1 | 8/2022 | Benavides | |
| 2010/0252691 A1* | 10/2010 | Malkin | F16H 25/20 244/76 R |
| 2014/0152012 A1* | 6/2014 | Kim | H02J 3/18 290/44 |
| 2015/0145325 A1 | 5/2015 | Mir et al. | |
| 2016/0329851 A1* | 11/2016 | Borisov | H02M 1/4233 |
| 2021/0044231 A1 | 2/2021 | Harke et al. | |

FOREIGN PATENT DOCUMENTS

EP 3200330 A1 8/2017

OTHER PUBLICATIONS

Baharom et al.,, "A High Power Factor Three-Phase AC-DC Current Injection Hybrid Resonant Converter", IECON 2016—42nd Anuual Conference of the IEEE Industrial Electronics Society, IEEE, Oct. 23, 2016, pp. 3123-3128, 6 pages.
International Search Report, EP Application No. 24178213.5; mailed Nov. 11, 2024, 9 pages.

* cited by examiner

*Primary Examiner* — Rexford N Barnie
*Assistant Examiner* — Thai H Tran
(74) *Attorney, Agent, or Firm* — CANTOR COLBURN LLP

(57) ABSTRACT

A power generation system includes a generator configured to output alternating current (AC) power, an active rectifier configured to receive the AC power from the generator, convert the AC power to direct current (DC) power, and output the DC power. A current injector is connected to the active rectifier and is configured to provide an injection current to power flowing through the active rectifier. The injection current includes a reactive component.

20 Claims, 5 Drawing Sheets

REACTIVE CURRENT INJENCTION FOR ACTIVE AEROSPACE RECTIFICATION

INTRODUCTION

The subject disclosure relates to three phase rectification in aerospace electronics, and more specifically to current injection controls for an active rectifier in an aircraft power systems.

Modern systems for generating electricity typically utilize mechanical rotation, such as excess rotation from a turbine shaft, an industrial machine, and the like, to generate alternating current (AC) power using a generator. This power can be provided from the generator to other electrically powered systems as operational power. When the electrically powered systems require direct current (DC) based energy, rectifiers are used to convert the AC power to DC power.

One type of rectification system uses an active rectifier with actively controlled switches, such as power MOSFETs or power bipolar junction transistors (BJT) to actively control current flow through a circuit and convert the current from AC to DC. Active rectification such as this has been used frequently in industrial applications where the fundamental frequency is fixed at about 50 Hz or 60 Hz. The same rectification technology faces challenges when used in aerospace power systems.

In aerospace applications, the power frequency can be as high as 800 Hz, about 16 times typical industrial power frequencies. The corresponding voltage drop across the rectifier inductance would be much higher. This may result in a high DC link voltage requires the use of higher voltage power switches and capacitors. When the semiconductor switch voltage rating is above 1200V, there is very limited choices available in terms of rating, package type, etc. Further, the switching loses, price and lead time for higher voltage switching devices also increases significantly as the fundamental frequency of the power escalates. In order to alleviate the increased losses, cost and lead times associated with high power electronics, in some cases it is desirable to limit a DC link voltage to at most 700V.

SUMMARY

In one exemplary embodiment a power generation system comprising: a generator configured to output alternating current (AC) power; an active rectifier configured to receive the AC power from the generator, convert the AC power to direct current (DC) power, and output the DC power; and a current injector connected to the active rectifier and configured to provide an injection current to power flowing through the active rectifier, the injection current including a reactive component.

In addition to one or more of the features described herein the generator is a variable frequency generator.

In addition to one or more of the features described herein the generator includes operational frequencies in the range of 360 Hz to 800 Hz.

In addition to one or more of the features described herein the generator is a component of a gas turbine engine.

In addition to one or more of the features described herein the injection current output by the current injector is controlled via a controller such that a power factor of the active rectifier is at least 0.9.

In addition to one or more of the features described herein the controller receives at least one sensed parameter of the generator and is configured to identify a corresponding injection current reactive component and a corresponding injection current real component based on the at least one sensed parameter.

In addition to one or more of the features described herein the controller includes a memory storing a lookup table associating ranges of values of the sensed parameter with the corresponding injection current reactive component and the corresponding injection current real component, and the corresponding injection current reactive component and the corresponding injection current real component are identified by consulting the lookup table.

In addition to one or more of the features described herein the controller includes a memory storing an equation relating the at least one sensed parameter with a required injection current reactive component magnitude, and wherein the controller is configured to command an injection current according to the stored equation.

In addition to one or more of the features described herein the at least one sensed parameter includes a frequency of the AC power from the generator.

In another exemplary embodiment a method for reducing a modulation index in a DC link voltage of an active rectifier includes injecting an injection current into current flowing through the active rectifier using a current injection circuit, wherein the injection current includes a real component and a reactive component.

In addition to one or more of the features described herein the method further includes maintaining a power factor of the active rectifier above 0.9.

In addition to one or more of the features described herein a magnitude of the reactive component of the injection current is dependent on at least one sensed parameter of a generator providing AC power to the active rectifier.

In addition to one or more of the features described herein, the magnitude of the reactive component of the injection current is determined via an injection current controller consulting a look up table associating ranges of the at least one sensed parameter with corresponding reactive injection current magnitudes.

In addition to one or more of the features described herein the at least one sensed parameter is a fundamental frequency of the AC power provided to the active rectifier.

In addition to one or more of the features described herein the fundamental frequency is in the range of 360 Hz to 800 Hz.

In addition to one or more of the features described herein the active rectifier receives power from a gas turbine engine generator.

In yet another exemplary embodiment an aircraft electrical system includes at least one generator disposed within a gas turbine engine generator; a power distribution system electrically connected to the at least one generator, the power distribution system including at least an active rectifier and a current injection circuit, the current injection circuit being configured to provide an injection current to the active rectifier, wherein the injection current includes a reactive component; and a plurality of electrical systems disposed throughout the aircraft and being configured to receive power from the power distribution system.

In addition to one or more of the features described herein the at least one generator is a variable frequency generator configured to provide output power having a fundamental frequency in the range of 360 Hz to 800 Hz.

In addition to one or more of the features described herein the aircraft electrical system further includes an injection current controller, configured to determine a magnitude of the reactive component of the injection current based on a sensed fundamental frequency of the output power, wherein the injection current is configured to maintain a power factor of at least 0.9.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
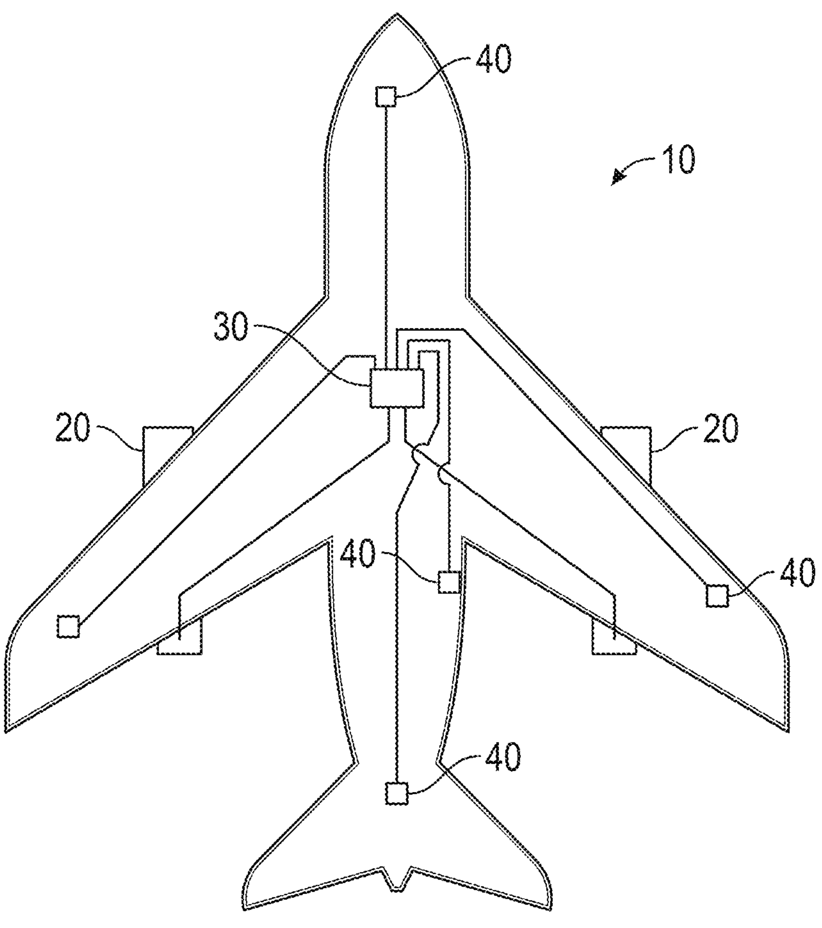
FIG. 1 is an example aircraft including a gas turbine engine, a generator and an electric power system.

FIG. 1 illustrates an exemplary aircraft 10, such as a passenger aircraft or a cargo aircraft. The aircraft 10 includes gas turbine engines 20, each of which includes an electric generator configured to convert excess rotation from the gas turbine engine 20 into electric power. The generators generate AC power and provide the AC power to a power distribution system 30. The power distribution system 30 includes an active rectifier, that converts the AC power to DC power. Once converted, the power distribution system provides the power to multiple electrical systems 40 distributed throughout the aircraft.

In a practical application the power distribution system 30 can include a dedicated power systems controller for controlling power distribution throughout the aircraft. In other examples, a general aircraft controller can directly or indirectly control the power distribution system 30.

Figure 2:
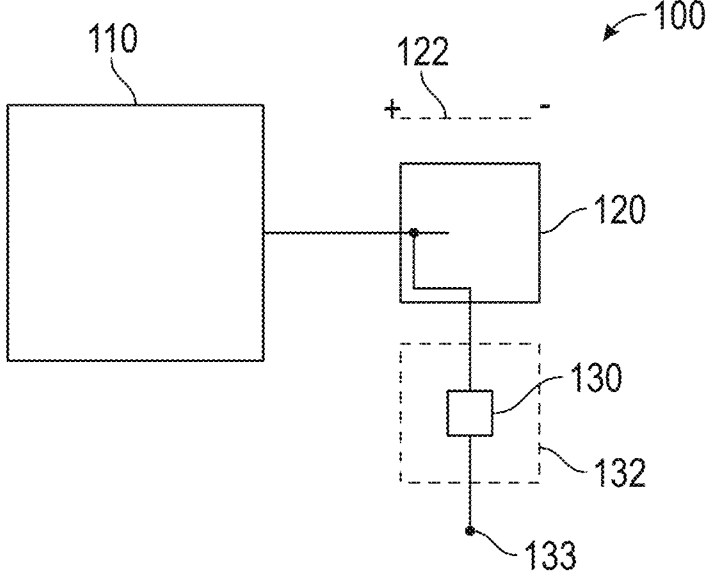
FIG. 2 is an example AC to DC rectification power system for the aircraft of FIG. 1.

With continued reference to the aircraft of FIG. 1, FIG. 2 illustrates a power system 100 including a generator 110, such as would be included within each of the turbine engines 20. An output of the generator 110 is provided to an active rectifier 120. The active rectifier 120 defines a voltage drop 122 and includes a DC link voltage. Connected to the active rectifier 120 is a current injector 130. The current injector 130 is configured to inject a current into current flow through the active rectifier 120, with the injected current including a reactive component. In the illustrated example, the injected current is added to the current flow upstream of internal electronics within the active rectifier 120. In one example, the current injector 130 is a component of a controller 132 that defines the magnitude of the injection current. In another example, the current injector 132 can be a distinct component that is controlled by a general purpose controller, a distributed control network or any similar system. In some examples, the current injection provided by the current injector 13 is defined within a controller memory based on look up tables correlating sensed engine parameters, generator parameters, or any other sensor information available throughout the aircraft with a corresponding injection current. Power for generating the injected current is provided to a power input 133 and may originate from any power source including batteries, the power distribution system 30, or any other form of stored power.

In one specific example, the controller 132 including the current injector 130, or a controller controlling the current injector 130 monitors the specific characteristics of the power output from the generator 110 and use a current injection value associated with the measured power output parameters. The association can be via a look up table correlating measured parameters with a required current injection or via a mathematical equation relating the measured parameters with a required current injection.

For high power aerospace applications, around and beyond 100 KW for example, active rectifiers 120 are required to operate at a fairly high DC link voltage. Multiple approaches to operating with the required DC link voltage can be utilized in practical applications. One approach is to design around having high DC link voltages by using higher voltage class components, such as 1700V components. Another approach to the high DC link voltage requirements is to use current injection on the third harmonic to keep the DC link voltage lower. The harmonic injection approach is effective only up to 13%~16%, and the injected harmonics can create common-mode harmonics and increases the common-mode filter size weight and cost. Both of these approaches, on their own, may be insufficient to meet the requirements of an aerospace application.

While operating in steady state, an active rectifier can be represented by a simplified phasor diagram. The simplified phasor diagram includes three phasors: the power supply phase voltage at the point of regulation (Es), the voltage drop across the inductance of the active rectifier (ωLI), and the voltage generated by pulse width modulation voltage (Vpwm). During a unity power factor operation (Pf=1.0), the pulse width modulation voltage is a vector sum of E and ωLI according to the following:

$$V_{PWM} = \sqrt{E_S^2 + (\omega LI)^2}$$

The pulse width modulation voltage is generated from modulating a DC voltage Vdc, with a modulation index Mi, according to the following:

$$V_{PWM} = \frac{1}{2} V_{dc} M_i \frac{1}{\sqrt{2}}$$

Figure 3:
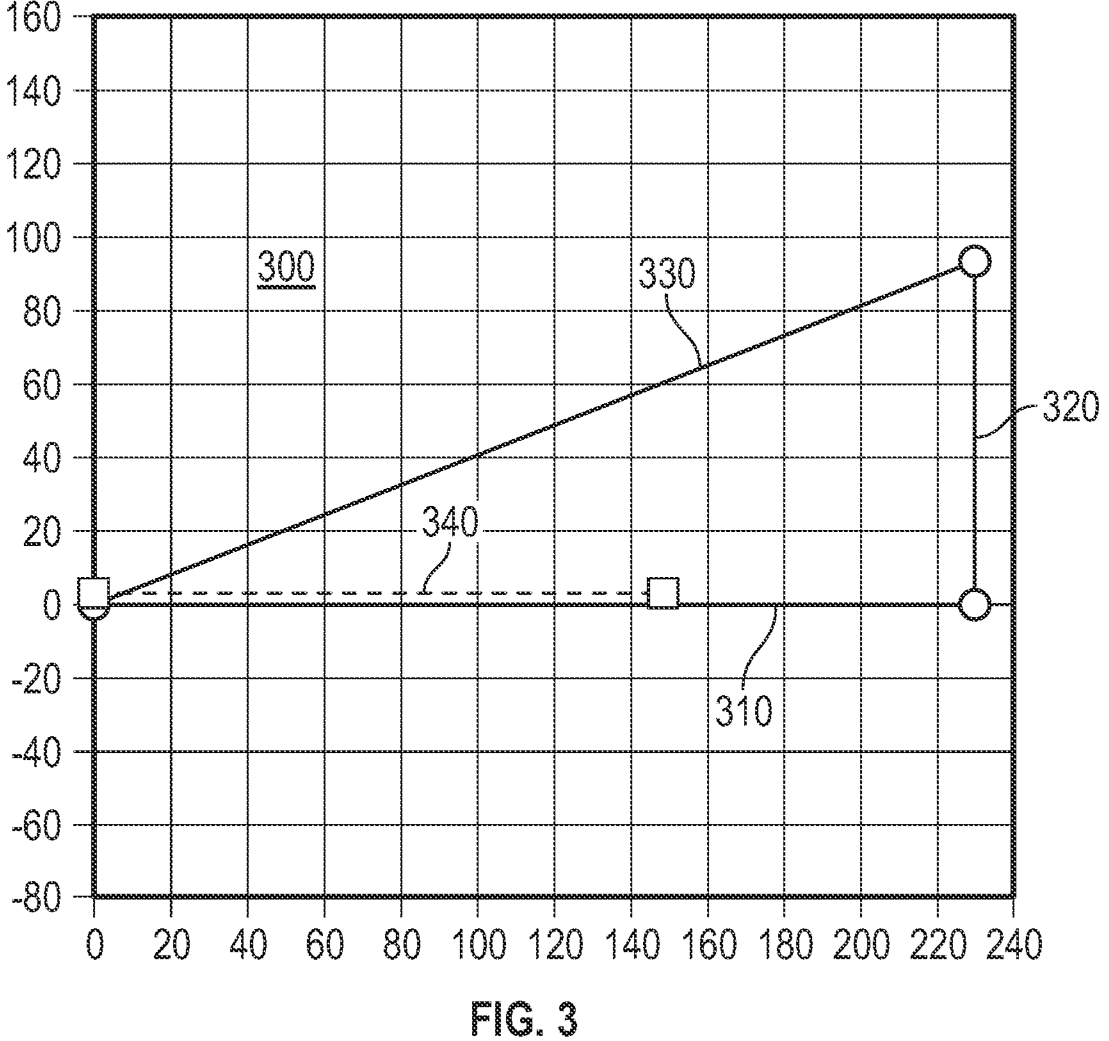
FIG. 3 is a plot of phasor diagram for an active rectifier operating at 230V, 800 Hz with a third harmonic current injection.

With continued reference to FIGS. 1 and 2, FIG. 3 provides a simplified phasor diagram 300 for an active rectifier operating at 230V, 800 Hz. The horizontal lines 310 is the Es vector value, the vertical line 320 is the ωLI vector value, and the diagonal line 330 Vpwm. In the illustrated example, the DC voltage (Vdc) is 700V, the power output P is 100 KW, the modulation index Mi is 1.012, and the power factor is 1.0. Also illustrated on the phasor diagram 300 is a current phasor 340. The current phasor 340 is in phase with Es 310 and is operating at unity power factor. At 100 KW and 700 Vdc, the modulation index Mi required is 1.012. The theoretical limit for Mi is 1.0. Due to switch voltage drops, dead time, and other factors, Mi>0.95 can be difficult to achieve without waveform distortion, meaning the practical limit of Mi is 0.95 or even lower. In light of these limits, the Mi of 1.012 is an over modulation condition.

As discussed above, one way to mitigate overmodulation is to inject third harmonic or triplen harmonics into to the modulation signal to effectively achieve Mi>1.0. The downside for this is the creation of common mode voltages that increase the required common mode inductor sizes, increase common mode voltage stress to electronic components. There is also a limit on the harmonics can be injected.

Figure 4:
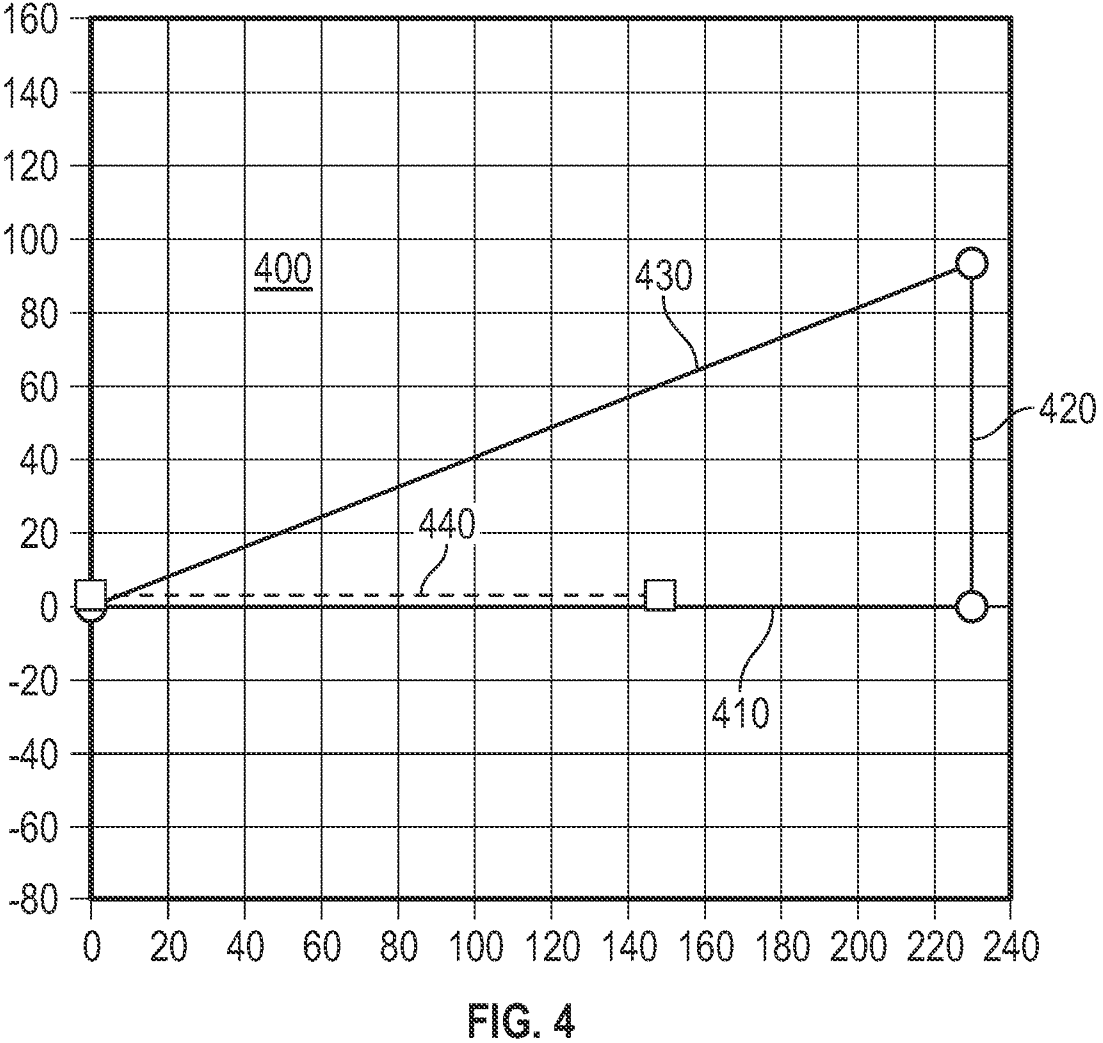
FIG. 4 is a plot of phasor diagram for an active rectifier operating at 230V, 800 Hz with an increased DC link voltage.
Figure 5:
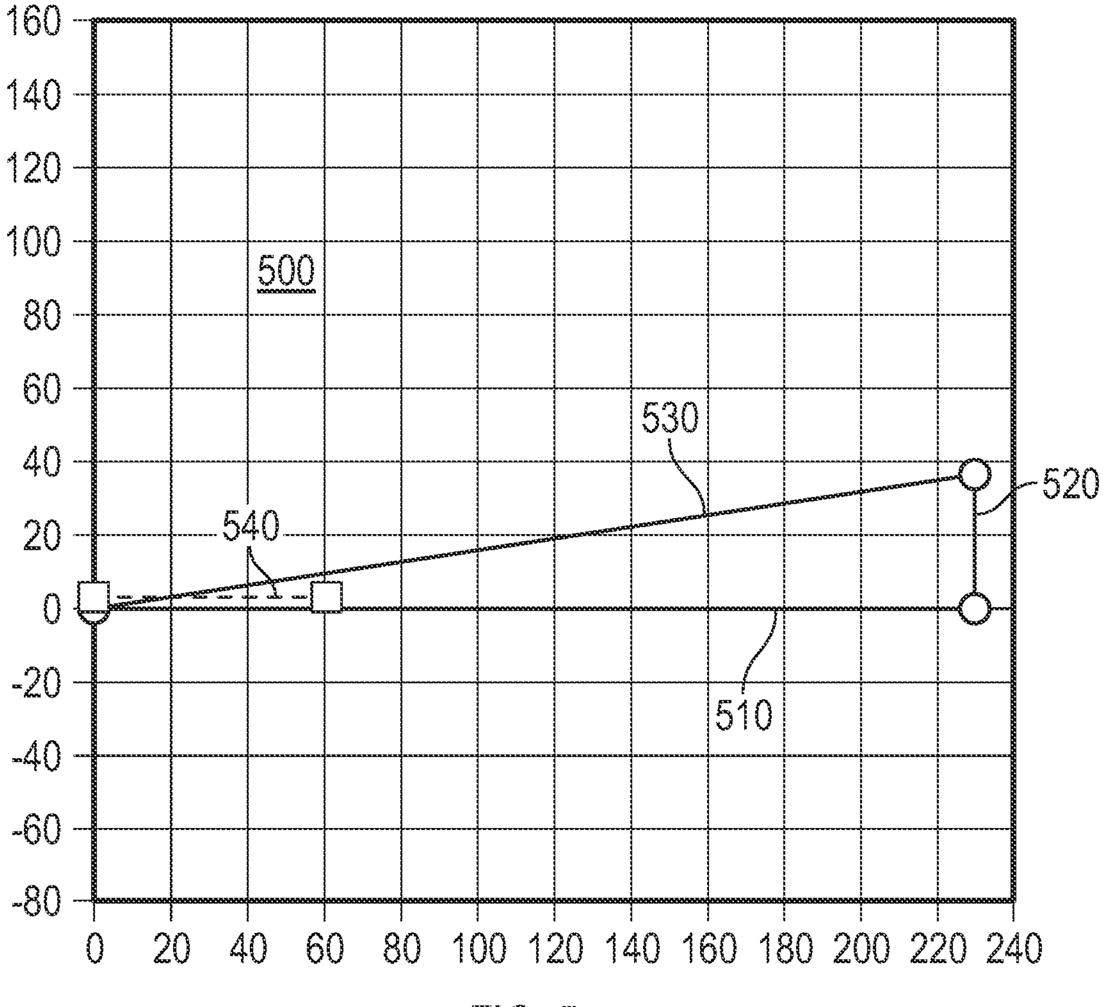
FIG. 5 is a phasor diagram for an active rectifier operating at 230V, 800 Hz with a reduced active rectifier output power.

With continued reference to FIGS. 1-3, and with like reference numbers indicating like elements, FIG. 4 demonstrates a phasor diagram 400 of another option to lower Mi to below 0.95 is by increasing the DC link voltage Vdc to above 750V. The horizontal line 410 is the Es vector value, the vertical line 420 is the ωLI vector value, and the diagonal line 430 Vpwm. In the illustrated example, the DC voltage (Vdc) is 750V, the power output P is 100 KW, the modulation index Mi is 0.95, and the power factor Pf is 1.0.

The higher Vdc is required in order to keep the Mi at a manageable range. The negative impacts of too high a DC link voltage is that it can put more stress on semiconductor switches resulting in a shorter life cycle and more frequent maintenance and may force a designer to select a high voltage class components that are much more expensive and less efficient. Further, due to manufacturing constraints, the high voltage components have limited options available in terms of package styles, size, weight and lead time and the high voltage components have a substantially higher cost penalty.

With continued reference to FIGS. 1-4, FIG. 5 illustrates another phasor diagram 500 where the horizontal line 510 is the Es vector value, the vertical line 520 is the @LI vector value, and the diagonal line 530 is the pulse width modulation voltage Vpwm. In the illustrated example, the DC voltage (Vdc) is 700V, the power output P is 40 KW, the modulation index Mi is 0.95, and the power factor is 1.0. The option illustrated in FIG. 5 reduces the modulation index Mi to a manageable level by reducing the active rectifier output power. In this particular example, reducing the power from 100 kW to 40 kW brings Mi from 1.012 to 0.95, and is a 60% power reduction.

With continued reference to FIGS. 1-5, FIG. 6 illustrates phasor diagram 600 of resulting from a method that combines the options described above. the horizontal line 610 is the Es vector value, the vertical line 620 is the ωLI vector value, and the diagonal line 630 is the pulse width modulation voltage Vpwm. In the illustrated example, the DC voltage (Vdc) is 700V, the power output P is 98.5 kW, the modulation index Mi is 0.95, and the power factor is 0.985. In some examples, the system can be configured to maintain a power factor of at least 0.9.

Figure 6:
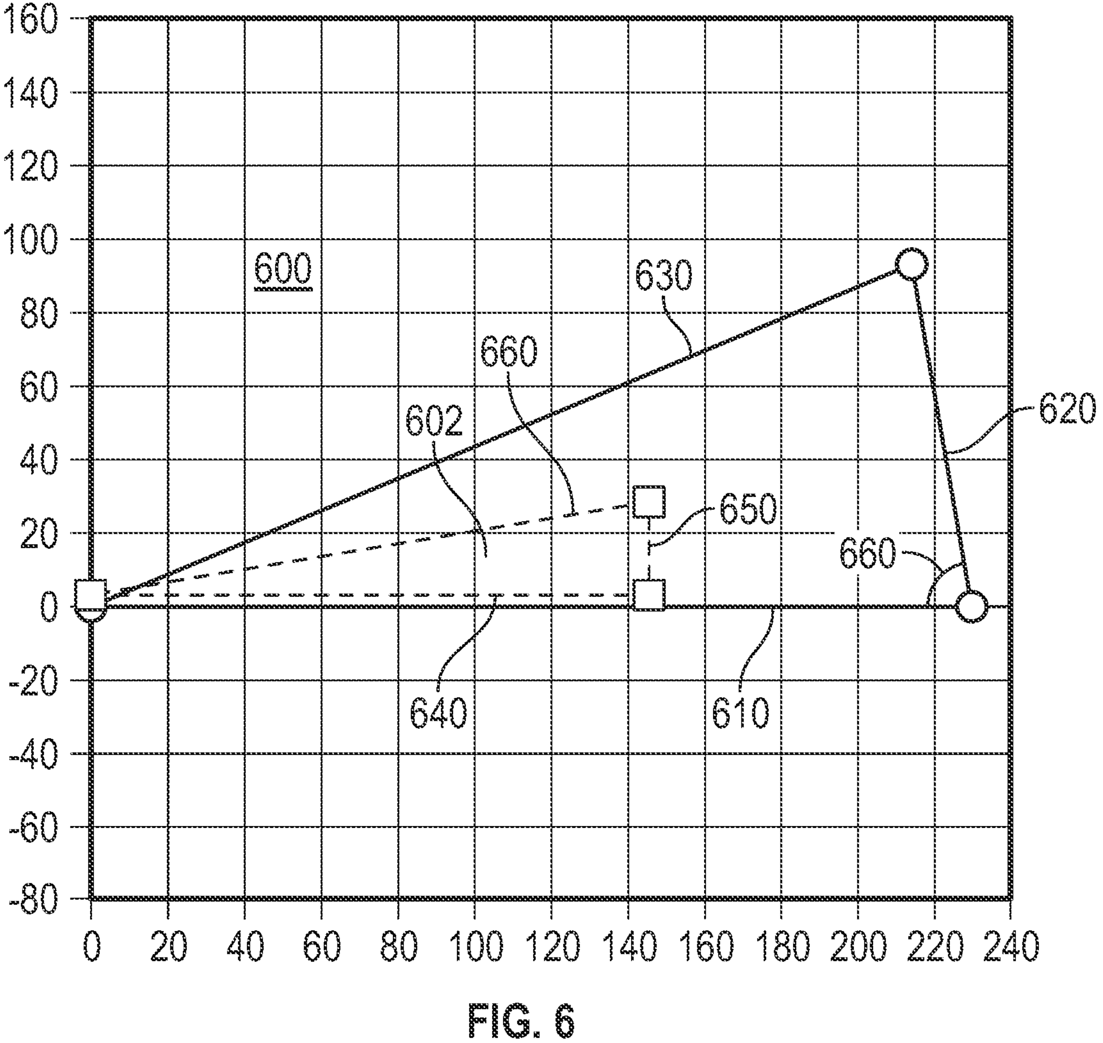
FIG. 6 is a phasor diagram for an active rectifier operating at 230V, 800 Hz with a current injection including a reactive current component.

In the combined method of FIG. 6, the current injector 130 adds a reactive power current component 650 to the injection current 640. By introducing a small amount of reactive power current into the modulation signal Vpwm, the modulation index Mi is reduced to a lower value without requiring a lower power. In this example case, the introduction of a small reactive current component in Vpwm command causes the current to shift about 10 degree from the terminal voltage (angle 660). The 10 degree current shift results in a power factor of 0.985 instead of 1.0. The reduction in power factor is small and typically negligible. The addition of the reactive current component also increases the total resultant current slightly. To keep the total current the same, the active current is slightly reduced and the rectifier power is reduced from 100 kW to 98.5 kW, the reduction by 1.5 kW is a negligible reduction for most practical applications.

To avoid over-modulation without increasing Vdc, Vpwm is reduced based on the following equations (with each of the variables maintaining the same meaning as described above):

$$Mi = 2*sqrt(2)*Vpwm/Vdc$$

$$Vpwm = sqrt[Es\hat{}2 + (\omega LI)\hat{}2]$$

When a reactive current component is introduced, the above equation becomes:

$$Vpwm = sqrt[(Es\hat{}2 + \omega * L * \mathrm{Im})\hat{}2 + (\omega * L * Ir)\hat{}2]$$

Where Im is the reactive current component of the current injected by the current injector 130 and Ir the active current component of the current injected by the current injector 130. It is possible in some examples to reduce Vpwm without having to reduce the active current Ir. Though in the example shown here, Ir is slightly reduced to keep the total current the same. One of skill in the art can determine the appropriate active current reduction, if any, based on the needs of a given specific implementation.

With reference again to FIG. 6, the figure includes the current phasor diagram 602 of this invention is illustrated here. The horizontal line 640 is the active current Ir, the vertical line 650 is the reactive current Im injected, and the third line 660, shifted by an angle from the horizontal axis, is the total current flowing into the active rectifier. The minimum amount of reactive current injection to bring Mi below 0.95 varies depending on the frequency of the active rectifier. At 800 Hz, the required reactive current injection is 25A, while at 360 Hz, only 3A of reactive current injection is needed. In examples where the frequency of the active rectifier varies, the controller 132 actively calculates the required reactive current injection based on the known relationship between the required reactive current injection and the frequency of the active rectifier. In alternative examples, the controller 132 can determine the required current injection using a look up table correlating the measured parameters of the power system with a corresponding reactive current value.

High frequency high power application of active rectifier requires a high DC link voltage that is not desirable. By using the reactive current injection control technique described herein, the modulation index can be lowered without increasing the DC link voltage. Using the reactive current injection alone does not inject any current harmonics. As a result active rectifier efficiency or power quality are not compromised and no common mode harmonic is introduced.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A power generation system comprising:

a generator configured to output alternating current (AC) power;

an active rectifier configured to receive the AC power from the generator, convert the AC power to direct current (DC) power by switching a set of actively controlled switches, and output the DC power;

a current injector connected to the active rectifier and configured to provide an injection current to power flowing through the active rectifier, the injection current including a reactive component; and a controller controllably in communication with the current injector and including a non-transitory memory, the non-transitory memory storing instructions for determining a value of the reactive component such that a modulation index (Mi) is less than or equal to 0.95, and instructions for controlling the current injector such that the reactive component is the determined value.

2. The power generation system of claim 1, wherein the generator is a variable frequency generator.

3. The power generation system of claim 2, wherein the generator includes operational frequencies in the range of 360 Hz to 800 Hz.

4. The power generation system of claim 1, wherein the generator is a component of a gas turbine engine.

5. The power generation system of claim 1, wherein the injection current output by the current injector is controlled via a controller such that a power factor of the active rectifier is at least 0.9.

6. The power generation system of claim 5, wherein the controller receives at least one sensed parameter of the generator and is configured to identify a corresponding injection current reactive component and a corresponding injection current real component based on the at least one sensed parameter.

7. The power generation system of claim 6, wherein the controller includes a memory storing a lookup table associating ranges of values of the sensed parameter with the corresponding injection current reactive component and the corresponding injection current real component, and the corresponding injection current reactive component and the corresponding injection current real component are identified by consulting the lookup table.

8. The power generation system of claim 6 wherein the controller includes a memory storing an equation relating the at least one sensed parameter with a required injection current reactive component magnitude, and wherein the controller is configured to command an injection current according to the stored equation.

9. The power generation system of claim 5, wherein the at least one sensed parameter includes a frequency of the AC power from the generator.

10. A method for reducing a modulation index in a DC link voltage of an active rectifier, the method comprising:

reducing the modulation index in the DC link voltage of the active rectifier to less than or equal to 0.95 by injecting an injection current into current flowing through the active rectifier using a current injection circuit, wherein the injection current includes a real component and a reactive component, wherein the active rectifier converts alternating current (AC) power to direct current (DC) power by switching a set of actively controlled switches.

11. The method of claim 10, further comprising maintaining a power factor of the active rectifier above 0.9.

12. The method of claim 10, wherein a magnitude of the reactive component of the injection current is dependent on at least one sensed parameter of a generator providing AC power to the active rectifier.

13. The method of claim 12, wherein the magnitude of the reactive component of the injection current is determined via an injection current controller consulting a look up table associating ranges of the at least one sensed parameter with corresponding reactive injection current magnitudes.

14. The method of claim 12, wherein the magnitude of the reactive component of the injection current is determined via an injection current controller consulting an equation associating specific values of the at least one sensed parameter with corresponding reactive injection current magnitudes.

15. The method of claim 10, wherein the at least one sensed parameter is a fundamental frequency of the AC power provided to the active rectifier.

16. The method of claim 15, wherein the fundamental frequency is in the range of 360 Hz to 800 Hz.

17. The method of claim 10, wherein the active rectifier receives power from a gas turbine engine generator.

18. An aircraft electrical system comprising:

at least one generator disposed within a gas turbine engine generator;

a power distribution system electrically connected to the at least one generator, the power distribution system including at least an active rectifier and a current injection circuit, the active rectifier being configured to convert alternating current (AC) power to direct current (DC) power by switching a set of actively controlled switches, the current injection circuit being configured to provide an injection current to the active rectifier, wherein the injection current includes a reactive component; and an injection current controller in communication with the current injector and including a non-transitory memory, the non-transitory memory storing instructions for determining a value of the reactive component such that the reactive component injects a third harmonic, and instructions for controlling the current injector such that the reactive component is the determined value; and a plurality of electrical systems disposed throughout the aircraft and being configured to receive power from the power distribution system.

19. The aircraft electrical system of claim 18, wherein the at least one generator is a variable frequency generator configured to provide output power having a fundamental frequency in the range of 360 Hz to 800 Hz.

20. The aircraft electrical system of claim 19, wherein the injection current controller is configured to determine a magnitude of the reactive component of the injection current based on a sensed fundamental frequency of the output power, wherein the injection current is configured to maintain a power factor of at least 0.9.

* * * * *